United States Patent
Quintero et al.

(10) Patent No.: US 8,822,385 B2
(45) Date of Patent: Sep. 2, 2014

(54) NANOEMULSIONS

(71) Applicants: Lirio Quintero, Houston, TX (US); David E. Clark, Humble, TX (US); Alexander John McKellar, The Woodlands, TX (US)

(72) Inventors: Lirio Quintero, Houston, TX (US); David E. Clark, Humble, TX (US); Alexander John McKellar, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/705,892

(22) Filed: Dec. 5, 2012

(65) Prior Publication Data

US 2013/0096036 A1 Apr. 18, 2013

Related U.S. Application Data

(60) Division of application No. 12/625,832, filed on Nov. 28, 2009, now Pat. No. 8,357,639, which is a continuation-in-part of application No. 12/490,783, filed on Jun. 24, 2009, now Pat. No. 8,210,263, and a continuation-in-part of application No. 12/146,647, filed on Jun. 26, 2008, now Pat. No. 8,091,646, and a continuation-in-part of application No. 11/866,486, filed on Oct. 3, 2007, now Pat. No. 8,091,645.

(60) Provisional application No. 61/193,449, filed on Dec. 1, 2008, provisional application No. 61/076,022, filed on Jun. 26, 2008, provisional application No. 60/947,870, filed on Jul. 3, 2007.

(51) Int. Cl.
*C09K 8/02* (2006.01)
*C09K 8/74* (2006.01)
*E21B 21/00* (2006.01)

(52) U.S. Cl.
USPC ............................. 507/103; 507/269; 175/65

(58) Field of Classification Search
USPC ..................................... 175/65; 507/103, 269
See application file for complete search history.

(56) References Cited

U.S. PATENT DOCUMENTS

| | | | |
|---|---|---|---|
| 3,920,073 A | 11/1975 | Holm | |
| 4,012,329 A | 3/1977 | Hayes et al. | |
| 4,017,405 A | 4/1977 | Holm | |
| 5,034,140 A | 7/1991 | Gardner et al. | |
| 5,096,883 A | 3/1992 | Mercer et al. | |
| 5,652,200 A | 7/1997 | Davies et al. | |
| 6,581,687 B2 | 6/2003 | Collins et al. | |
| 6,613,720 B1 | 9/2003 | Feraud et al. | |
| 6,852,676 B1 | 2/2005 | Chatterji et al. | |
| 7,169,739 B2 | 1/2007 | Falana et al. | |
| 7,220,707 B2 | 5/2007 | Massam et al. | |
| 7,267,291 B2 | 9/2007 | Bradbury et al. | |
| 8,357,639 B2 | 1/2013 | Quintero et al. | |
| 2003/0155157 A1 | 8/2003 | Patel et al. | |
| 2005/0129639 A1* | 6/2005 | Quemin | 424/63 |
| 2005/0209368 A1 | 9/2005 | Yang et al. | |
| 2006/0057170 A1 | 3/2006 | Guiramand | |
| 2006/0096757 A1 | 5/2006 | Berry et al. | |
| 2008/0026954 A1 | 1/2008 | Wu et al. | |
| 2008/0076682 A1 | 3/2008 | Jones et al. | |
| 2008/0110618 A1 | 5/2008 | Quintero et al. | |
| 2009/0118380 A1* | 5/2009 | Del Gaudio et al. | 514/772 |
| 2011/0015266 A1* | 1/2011 | Hanefeld et al. | 514/543 |

FOREIGN PATENT DOCUMENTS

| | | |
|---|---|---|
| WO | 2004050790 A1 | 6/2004 |
| WO | 2005-090851 A1 | 9/2005 |
| WO | 2007-112967 A1 | 10/2007 |
| WO | 2008-010788 A2 | 1/2008 |
| WO | 2008033838 A2 | 3/2008 |
| WO | 2008134332 A1 | 11/2008 |
| WO | 2009-155353 A1 | 2/2009 |

OTHER PUBLICATIONS

Song, Zhaohui, et al., "Nanoemulsions: A New Vehicle for Chemical Additive Delivery," Foreign Oil Field Engineering, Apr. 20, 2008, pp. 31-35 (from the translated Chinese Notification of First Office Action).
K. Shinoda, et al., "The Stability of O/W Type Emulsions as a Function of Temperature and the HLB of Emulsifiers: The Emulsification by the PIT-method", J. Colloid Interface Sci., 30, pp. 258-263 (1969).
J. L. Salager, "Emulsions Properties and Related Know-how to Attain Them," Nanoemulsions, Pharmaceutical Emulsions and Suspensions, Chapter 3, New York: Marcel Dekker, pp. 73-125 (2000).
J. L. Salager, et al., "Partitioning of Ethoxylated Octylphenol Surfactants in Microemulsion-oil-water Systems: Influence of Temperature and Relation Between Partitioning Coefficient and Physicochemical Formulation," Langmuir 16, pp. 5334-5539 (2000).
A. Forgiarini, et al., "Formation and Stability of Nano-emulsions in Mixed Nonionic Surfactant Systems," Prog. Colloids Polymer Sci., 118, pp. 184-189 (2001).
C. Solans, et al., "Nanoemulsion: Formation, Properties and Applications," Adsorption and Aggregation of Surfactants in Solution, Surfactant Science Series, Marcel Dekker, New York, pp. 525-554 (2003).
T.G. Mason, et al., "Nanoemulsions: Formation, Structure, and Physical Properties," Journal of Physics: Condensed Matter, 18, R635-R666 (2006).

* cited by examiner

*Primary Examiner* — Aiqun Li
(74) *Attorney, Agent, or Firm* — Mossman Kumar & Tyler PC

(57) ABSTRACT

Nanoemulsions have been discovered to be useful to the oil field. More particularly water-in-oil (W/O), oil-in-water (O/W) and other classes of nanoemulsions have found beneficial application in drilling, completion, well remediation and other oil and gas industry related operations. Additionally, nanoemulsions may reduce friction pressure losses, as well as reduce subsidence of solid weight material during oil and gas operations. New preparation methods for nanoemulsions have also been discovered.

18 Claims, No Drawings

NANOEMULSIONS

CROSS-REFERENCE TO RELATED APPLICATION

This application is a divisional patent application from U.S. Ser. No. 12/625,832 filed Nov. 25, 2009, which issued Jan. 22, 2013 as U.S. Pat. No. 8,357,639, which in turn claims the benefit of U.S. Provisional Patent Application No. 61/193,449 filed Dec. 1, 2008, where U.S. Ser. No. 12/625,832 is a continuation-in-part application of U.S. patent application Ser. No. 12/490,783 filed Jun. 24, 2009, which issued Jul. 3, 2012 as U.S. Pat. No. 8,210,263, which claims the benefit of U.S. Provisional Patent Application No. 61/076,022 filed Jun. 26, 2008, and is also a continuation-in-part of U.S. patent application Ser. No. 12/146,647 filed Jun. 26, 2008, which issued Jan. 10, 2012 as U.S. Pat. No. 8,091,646, which application in turn claims the benefit of U.S. Provisional Patent Application No. 60/947,870 filed Jul. 3, 2007, and which is additionally a continuation-in-part application of U.S. Ser. No. 11/866,486 filed Oct. 3, 2007, which issued Jan. 10, 2012 as U.S. Pat. No. 8,091,645, all of which are incorporated herein in their entirety by reference.

TECHNICAL FIELD

The present invention relates to nanoemulsions, their preparation and their uses, such uses including those relating to the oil field (the oil and gas industry). This invention also relates to water-in-oil (W/O), oil-in-water (O/W) and other classes of nanoemulsions. It more particularly relates, in non-limiting embodiments, to nanoemulsions and their preparation and use in drilling, completion, well remediation and other oil and gas industry related operations. In addition, the invention relates to reducing friction pressure losses and/or reducing subsidence of solid weight material, such as barite sag or settling of particles in the annulus of a well, during oil and gas operations.

BACKGROUND

Nanoemulsions have many physical properties that distinguish them from other emulsions. Due to their small mean droplet size, which is often smaller than optical wavelengths of the visible spectrum (thus less than about 400 nm), nanoemulsions usually appear transparent or translucent to the naked eye, even at high droplet volume fractions. The terms sub-micron emulsion (SME) and miniemulsion are sometimes used as synonyms for the term nanoemulsion. Nanoemulsions have great potential for use in many industries and applications.

A nanoemulsion may be defined as a type of emulsion wherein the dispersed/discontinuous phase has a mean droplet size of less than 1000 nm; the components of the continuous and dispersed/discontinuous phases must be immiscible enough to allow for the respective phase formation. Some nanoemulsions may have a smaller range for mean droplet size specified, and it is possible to have more than one dispersed/discontinuous phase. These emulsions are typically composed of a nonpolar phase (usually denoted as the oil phase), a polar phase (typically aqueous and denoted as the aqueous or water phase), a surfactant and optionally one or more additional co-surfactant(s). There may be a narrow droplet size distribution depending on the preparation process.

Nanoemulsions are usually stable against sedimentation or creaming, with high kinetic stability, probably because Brownian motion and diffusion rates are higher than the sedimentation or creaming rates induced by gravity. However, they are usually non-equilibrium systems (typically requiring energy input for formation), and thus thermodynamically unstable, and therefore have a tendency to separate into the constituent phases.

In general, there are two primary methods to prepare a nanoemulsion: (1) by "persuasion" and (2) by "brute force", which are described in the chapter, "Nanoemulsions", by Salager, Forgiarini and Marquez, in *Pharmaceutical Emulsions and Suspensions*, ($2^{nd}$ edition), Nielloud and Marti-Mestres editors, Taylor and Francis (London). Preparation by persuasion involves taking advantage of certain phase transitions, while preparation through brute force involves imparting sufficient shear to reduce the droplet size of the immiscible internal phase below 1000 nm. These methods may be further described as follows.

(1) By Persuasion

(1.1) Phase Transition from Near-Optimum State Via Change in Single Variable This method involves change in one formulation variable such as salinity or temperature for a system near optimal (HLD (hydrophilic lipophilic deviation) near 0), such as applying a higher temperature to a Winsor III microemulsion (a middle-phase microemulsion in equilibrium with two excess phases, water and oil; it can be understood as an accumulation of swollen micelles, so numerous that they touch one another, forming a perfectly bicontinuous structure).

(1.2) Phase Transition from Near-Optimum State Via Change in Multiple Variables This method involves change in more than one formulation variable, such as applying higher temperature and inclusion of additional salt in a Winsor III microemulsion.

(1.3) Catastrophic Inversion

This method involves causing a low internal phase emulsion to invert such that the internal phase becomes the external phase.

(1.4) Phase Transition Stabilized by Liquid Crystal Formation

This method involves stabilization of nanodroplets by liquid crystal formation from a state near HLD=0.

(2) By Brute Force

This method may involve the use of a high speed mixer, a high pressure homogenizer, a high frequency ultra-sonic device, a small pore membrane, etc.

Surveys of recent literature show that formation of O/W and W/O nano-emulsions by dispersion or high-energy emulsification methods is apparently fairly common, while nanoemulsion formation by condensation or "low-energy" emulsification methods, which take advantage of the physicochemical properties of these systems based on the phase transition that takes place during the emulsification process, is apparently starting to attract interest. The latter mentioned "low energy" procedures can be carried out by operating in particular areas of the phase diagram with a very low interfacial tension, which are areas of liquid crystals and microemulsions; at the end of the emulsification process, nanoemulsions formed are not in thermodynamic equilibrium as was the original system.

Properties of nanoemulsions, such as small droplet size, relative high kinetic stability and optical transparency seem to depend (at least in many cases) not only on composition variables but also on preparation variables such as emulsifying path, degree of mixing energy input and emulsification time. These are described further in T. G. Mason, J. N. Wilking, K. Meleson, C. B. Chang, and S. M Graves, "Nanoemulsions: Formation, Structure, and Physical Properties", *Journal of Physics: Condensed Matter*, 18 (2006) R635-R666; and in C. Solans, J. Esquena. A. M. Forgiarini, N. Uson, D. Morales, P. Izquierdo, and N. Azemar, "Nanoemulsion: Formation, Properties and Applications" in D. Shah, B. Moudgil, K. L. Mittal (Eds.), *Adsorption and Aggregation of Surfactants in Solution, Surfactant Science Series*, Marcel Dekker, New York, 2003, pp 525-554.

Nanoemulsions are an emerging technology which show promise for application in many industrial areas. Current main applications of nanoemulsions seem to concentrate in high value-added fields, such as in nanoreactors for polymerization, in chemical, cosmetic and pharmaceutical applications and in the food industry. One recent example of this relates to a composition and methods for making and using nanoemulsions as a delivery system, the emulsions created by high shear stress technology, and gives applications in the nutritional, pharmaceutical and cosmetics fields.

It is of note that nanoemulsions can typically be formulated using less surfactant than is required for many microemulsions; thus, it is very likely that nanoemulsions will play an increasingly important role commercially. A major cost component involved in producing nanoemulsions is usually the energy input required; methods of reducing this energy cost are of interest.

A recently conducted literature survey revealed no mention of the use of nanoemulsions in drilling, completion, remediation or many other oil field fluids or processes. A few items of interest were noted.

One such item is WO 2005/090851 which relates to the use of polymeric nanoemulsions as drag/friction and/or pressure reducers for multiphase flow. The polymeric nanoemulsions are said to facilitate flow and reduce drag and friction in multiphase pipelines containing both oil and water including oil/water, oil/water/gas, oil/water/solids, and oil/water/gas/solids, such as are used for oil or gas production, gathering, and transmission and for hydro-transport of oil sand or heavy oil slurries. The polymeric nanoemulsion drag reducers are made by combining components with sufficient mixing to form droplets of acceptably small size with the nanoemulsions reported to be storage stable and to have a low viscosity of about 200 cP or less which enables easy pumping. These nanoemulsions have a hydrocarbon external phase, droplets of an aqueous internal phase having water-soluble polymer dissolved therein, where the droplets have an average size below about 300 or even 200 nm, and at least one surfactant. An example of a suitable drag reducing polymer used here is polyacrylamide. One particular application of the composition is the continuous injection of the nanoemulsion polymer product through a subsea umbilical into multiphase flowlines to achieve increased production and/or reduction in pressure drop through the treated system.

Another item noted is U.S. Patent Application Publication No. 2008/-0110618 which discloses nanoemulsion, macroemulsion, miniemulsion and microemulsion systems with excess oil or water or both (Winsor I, II or III phase behavior) or single phase microemulsions (Winsor IV) that improve the removal of filter cakes formed during hydrocarbon reservoir wellbore drilling with oil based muds. The macroemulsion, nanoemulsion, miniemulsion and microemulsion systems with excess oil or water or both or single phase microemulsion removes oil and solids from the deposited filter cake. In one embodiment, the emulsion system (a single phase microemulsion, nanoemulsion, or other emulsion) may be formed in situ (downhole) rather than produced or prepared in advance and pumped downhole. Skin damage from internal and external filter cake deposition might be reduced using these systems.

Given the short supply of energy in the world today, there is always a need to produce oil and gas and related materials more efficiently. There are many sources of inefficiency; for example, it is well known that friction pressure losses and subsidence of solid weighting materials reduce such efficiency and that the use of certain additives can increase it; some of this is described in more detail below.

Numerous drilling fluids and procedures used in the drilling of subterranean oil and gas wells along with many related fluids and procedures in the oil and gas industry (such as completion and remediation) are known in the art. Much of the discussion that follows on drilling can be applied to other oil field fluids and processes as well.

In rotary drilling, there are a variety of functions and characteristics that are expected of drilling fluids, also known as drilling muds, or simply "muds". Drilling fluids are typically classified according to their base fluid. In water-based muds, solid particles are typically suspended in water or brine. Oil can be emulsified in the water which is the continuous phase. Brine-based drilling fluids are water-based muds (WBMs) in which the aqueous component is brine. Oil-based muds (OBM) are the opposite or "inverse"; solid particles are typically suspended in oil, and water or brine is emulsified in the oil and therefore the oil is the continuous phase. Oil-based muds may be either all oil or water-in-oil emulsions, which are also called invert emulsions. In oil-based mud, the oil can consist of any oil that may include, but is not limited to, diesel, mineral oil, esters, or olefins. OBMs as defined herein include synthetic-based fluids or muds (SBMs) which are synthetically produced rather than refined from naturally-occurring materials. SBMs often include, but are not necessarily limited to containing, olefin oligomers of ethylene, esters made from vegetable fatty acids and alcohols, or ethers and polyethers made from alcohols and polyalcohols, paraffinic and other natural products and mixtures of these.

Solid particles are often added to drilling fluids for various reasons. Weighting agents such as barite, calcite or hematite particles may be added to the drilling mud to increase the density of the fluid and ensure that the fluid provides adequate hydrostatic pressure in the wellbore. These particles may settle and/or stratify in the fluid as it is being pumped through the wellbore. It is well known that settling and sagging of solids such as barite may lead to safety and operational problems, particularly in inclined boreholes. In weighted drilling muds, barite as well as other weighting agents tends to segregate slowly, settle in the lower side of the borehole and start sliding in boreholes drilled at high angles from the vertical. The main problems caused by this phenomenon are pressure control due to density variations or non-linear hydrostatic pressure gradients, lost circulation, high torque and drag. Stuck pipes and plugged boreholes and even lost circulation occur because of the presence of thick and tight barite beds. Traditionally, organophilic clays have been added to drilling fluids to overcome the sag problem. However, these materials increase the viscosity of the drilling mud causing a decrease in drilling efficiency since relative high pumping pressure may be required.

Another important oil and gas operation is completion. Completion is the operation that prepares a well bore for actually producing oil or gas from the reservoir. The goal of the completion operation is to optimize the flow of the reservoir fluids into the well bore, up through the producing string, and into the surface collection system. The nature of the reservoir helps determine the type of completion to be used, such as open hole or cased hole completion, as well as helping determine fluid selection. Many applicable methods and fluids are described in the art.

Oil and gas well remediation is important to the industry as well. This refers to attempts at restoration of the initial characteristics of producing formation rocks or removal of formation damage. Remediation may involve use of one or more of a variety of fluids and methods of application with many described in the art.

There are other important oil and gas operations, including acidizing, stimulation and fracturing. Many fluids and procedures for these are known in the art.

There is still a need for improved methods and compositions for these various operations, and nanoemulsions are found to fill this need.

SUMMARY

There are provided herein nanoemulsion compositions comprising: (1) a continuous phase, (2) a discontinuous or dispersed phase with a mean droplet size of less than 1000 nm, (3) a surfactant and (4) a solid weighting agent; wherein, one of the phases (1) and (2) is a non-polar based phase and the other of these is a polar based phase.

One alternative nanoemulsion composition comprises: (1) a continuous phase, (2) a discontinuous or dispersed phase with a mean droplet size of less than 1000 nm, and (3) a surfactant; wherein, one of the phases (1) and (2) is an non-polar based phase and the other of these is a polar or aqueous based phase, with the polar or aqueous based phase comprising a polar solvent or water and a dissolved salt of formic acid. Alternatively, an ammonium salt may be used in place of or in combination with the salt of formic acid. These alternative nanoemulsion compositions may further comprise a co-surfactant and/or one or more additives.

There is also provided in one non-limiting embodiment methods of making nanoemulsion compositions comprising: (1) mixing a group of components comprising an oil or other non-polar solvent and a surfactant; (2) adding a polar or aqueous based salt solution to the result of (1) with mixing; (3) mixing the result of (2); (4) adding more of the salt solution to the result of (3) while mixing; and (5) mixing the result of (4).

Additional non-restrictive nanoemulsion compositions may be defined in a "product-by-process" sense corresponding to each of the methods of making nanoemulsions compositions given herein (including all variations and combinations). It is worth noting here that nanoemulsion compositions may be path dependent; that is, different compositions may result when the same components are combined using different methods.

In another non-restrictive version there are provided methods of using nanoemulsion compositions in various processes relating to the oil and gas industry. Such methods include, but are not necessarily limited to: drilling a wellbore using a fluid comprising a nanoemulsion; completing a well using a fluid comprising a nanoemulsion; remediating a subterranean formation using a fluid comprising a nanoemulsion; stimulating a subterranean formation using a fluid comprising a nanoemulsion; and fracturing a subterranean formation using a fluid comprising a nanoemulsion. Any of these methods may be done with or without acid or acidizing as applicable.

Similarly, other methods for the use of nanoemulsions include using these emulsions in acidizing/acid treatments per se or in combination with other operations, well treatments generally, as well as in cleaning pipes, pipelines, tanks and vessels. Any of these methods may be done with or without acid or acidizing as applicable.

Nanoemulsion compositions may be used in or as fluids for oil and gas operations resulting in sag reduction and/or friction pressure reduction compared to when they are not used.

DETAILED DESCRIPTION

It has been discovered that nanoemulsions are useful as oil field fluids, such as a drilling, completion or remediation fluid, among other uses. Methods of preparation and uses thereof are also set out. The nanoemulsions are ordinarily stable and can contain significant amounts of brine while retaining uniform dispersion. They may allow for density control based upon the salt type, content and volume of brine, with and without the use of solid weighting materials, which allows for efficient drilling, completion, remediation or other oil field fluids, often with very low viscosity and/or solids content. The nanoemulsions include, but are not necessarily limited to, water-in-oil (W/O), oil-in-water (O/W) and other classes of nano-emulsions. Such designs usually have several benefits, including reduced pressure losses and reduced subsidence of weight material. Selection of a particular nanoemulsion may be via a phase diagram.

Nanoemulsions may be used in novel drilling and other oil field fluids to improve performance and efficiency of operations. This may be through various means such as in reducing friction pressure losses, as a means to aid and improve the ability to suspend solid particles (which might be done inside the droplets of the nanoemulsions) to reduce the settling and sagging of particles in the annulus of a well during the drilling or completion operations or at other times and locations in these and related operations and/or as a means to provide better delivery of additives.

Note that throughout this disclosure that "nanoemulsion" and "nanoemulsion composition" and the like are to be considered as interchangeable terms, unless otherwise indicated.

The nanoemulsion compositions herein comprise: (1) a continuous phase, (2) a discontinuous or dispersed phase with a mean droplet size of less than 1000 nm, (3) a surfactant and (4) a solid weighting agent; wherein, one of the phases (1) and (2) is a non-polar based phase and the other of these is a polar based phase.

In these nanoemulsion compositions, the solvents for phases (1) and (2) must be immiscible enough to allow for the formation of the phases specified. It should be understood that the surfactant (3) may be present within phase (1), within phase (2), between phase (1) and (2), elsewhere within the nanoemulsion composition, or at some combination of these locations, and similarly and independently that the solid weighting agent (4) may be present within phase (1), within phase (2), between phase (1) and (2), elsewhere within the nanoemulsion composition, or at some combination of these locations. The materials chosen for the surfactant (3) and the solid weighting agent (4) are taken to be single chemical species, distinct from each other, unless otherwise specified. The surfactant (3) might be a bifunctional, yet a single chemical species surfactant, such as one having polyglycol and polyamino functionality in the same molecule, however.

The mean droplet size (synonymous with average droplet diameter) of the discontinuous phase in these compositions may alternately be in a subrange coming within the overall range of less than 1000 nm. Such subranges (in nm) would include any that can be described by any of the following numbers as its upper end (except the lowest of course) with any of the following that is a lower number as the lower end, as well as any ranges that can be described as "less than" any of the following numbers, the numbers being: 995, 950, 900, 800, 750, 700, 600, 500, 400, 300, 250, 200, 100, 75, 50, 25, 20, 10, 5 and 1. Of course, the mean droplet size is understood to always be larger than zero. Some specific ranges of interest include, but are not necessarily limited to, 1 to 100 nm, 1 to 500 nm; 20 to 500 nm; 100 to 500 nm; 400 to 700 nm which is approximately the wave-length range of visible light; 1 to 995 nm; and less than 1000, 750, 700, 500, 400, 100 or 75 nm.

The mean droplet size (or average diameter of the droplets) of the discontinuous phase may be determined via a size distribution profile found using a technique known in the art as Dynamic Light Scattering (DLS) or Photon Correlation Spectroscopy (PCS). In this technique, the distribution of diffusion coefficients is determined by measurement and correlation of the statistical fluctuations in the light scattered from a system of particles (here the droplets) under the influence of Brownian motion (also called "random walk"). The average diameter of the scattering particles can be calculated based on the diffusion coefficient D and the known viscosity of the system by applying the Stokes-Einstein relation:

$$D = kT/6\pi\eta r.$$

where k is the Boltzmann constant, T is the absolute temperature in degrees Kelvin, $\eta$ is the viscosity of the solvent and r is the average particle radius.

It might be useful in some embodiments to have and/or to distinguish between two or more discontinuous phases.

In the nanoemulsion compositions, the non-polar based phase may be oil based (such as based on diesel, mineral oil, hydrocarbons, olefins, esters or other solvents or mixtures of these known in the art for use in the oil phase of an emulsion) and/or the polar based phase may be aqueous based (or based on some other polar solvent such as methanol, ethanol or iso-propanol). The polar based phase may comprise a dissolved salt and when this phase is an aqueous based phase, it may comprise water and a dissolved salt. In any case, the dissolved salt is taken to be a single chemical species that is different from the material chosen for the surfactant (3) and for the solid weighting agent (4), as applicable, unless otherwise specified.

For W/O or O/W nanoemulsions, the volumetric or weight ratio range of oil:water may be 99:1 to 1:99 or otherwise, depending on the embodiment.

A variety of surfactants may be used for the surfactant (3) in the nano-emulsions including, but not necessarily limited to, anionic surfactants, nonionic surfactants, cationic surfactants, amphoteric surfactants and (extended) surfactants containing a non-ionic spacer-arm central extension and an ionic or nonionic polar group. More specific surfactants of interest include, but are not necessarily limited to, monomeric cationic and monomeric amphoteric types. Other examples include, but are not necessarily limited to, anionic surfactants selected from the group consisting of alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters; non-ionic surfactants selected from the group consisting of amides, diamides, polyglycol esters, alkyl polyglycosides, sorbitan esters, methyl glucoside esters and alcohol ethoxylates; cationic surfactants selected from the group consisting of arginine methyl esters, alkanolamines and alkylenediamines; and (extended) surfactants containing a non-ionic spacer-arm central extension and an ionic or nonionic polar group, wherein the non-ionic spacer-arm central extension results from of polypropoxylation, polyethoxylation or both. Other suitable surfactants are dimeric or gemini surfactants, cleavable surfactants and fluorinated surfactants.

Materials that may be used for the solid weighting agent (4) include, but are not necessarily limited to, any of the variety of materials known in the art for this purpose such barium sulfate, calcium carbonate, hematite, ilmenite, siderite and manganese tetraoxide. Use of a combination of materials here may be specified at times as well. The key here is that these materials have very limited solubility in water or oil, and they are present in enough concentration so as to be to some extent suspended solids in the fluid in question. It should be understood that the designation barium sulfate is taken to include the chemical species as well as the mineral form, barite, and similarly for calcium carbonate and calcite.

The average diameter of the weighting agent particles may also be significant. In particular, it may be useful to sometimes specify that at least in the discontinuous phase (and maybe other phase(s) and/or overall in the nanoemulsion) that the average diameter of the weighting agent is smaller than the mean droplet size in the corresponding nanoemulsion's discontinuous phase; possible mean droplet sizes are given above and serve as specific disclosure for solid weighting agent particle size within the limits specified here. Thus for example, where the mean droplet size is 400 to 700 nm, the average diameter of a solid weighting agent used might be specified as any size smaller than 400 nm such as less than 400, 300, 250, 200, 100, 75, 50, 25, 20, 10, 5 or 1 nanometer (nm), or within ranges that can be constructed from these numbers. In other instances, other criteria and sizes might be specified, such as average diameter of the weighting agent in either or both phases as less than 10, 5, 1, 0.5, 0.1, 0.05, 0.01, 0.005 or 0.001 millimeter (mm), or less than 500, 250 or 100 nanometers (nm).

It should be understood that an insoluble material (such as a mineral, a sized or ground solid or a polymer) other than what is "known in the art" as a possible solid weighting agent may also be used as solid weighting agent (4) as long as it may perform a weighting function. Considerations applicable to "standard" solid weighting agents given herein would also apply to these "alternate" solid weighting agents. If such a material does not perform a weighting function, then it may be used as an additive, but would not be considered as being the solid weighting agent (4) in such a case, but only an additive.

The dissolved salt (taken as distinct throughout from weighting agents, surfactants, co-surfactants, additives, or the like also present, unless indicated otherwise), if present in the polar or aqueous based phase of the nanoemulsion compositions may be any salt that can be dissolved to some appreciable extent in the polar or aqueous based phase, including any such soluble chlorides, bromides, sulfates, phosphates, formates, acetates, citrates or ammonium salts. Some more specific examples include soluble chlorides of sodium, potassium, calcium, silver, cobalt, nickel, copper, zinc or iron;

bromides of sodium, potassium, calcium, silver, cobalt, nickel, copper, zinc or iron; sulfates of sodium, potassium, calcium, silver, cobalt, nickel, copper, zinc or iron; phosphates of sodium, potassium, calcium, silver, cobalt, nickel, copper, zinc or iron; formates, acetates or citrates of sodium, potassium, cesium or some other cation; and ammonium chloride, bromide, sulfate, phosphate, formate, acetate, citrate or ammonium salts of some other anion. The dissolved salt may actually be specified as a combination of such species at times. As to concentration, the amount of dissolved salt may among various embodiments be in any range possible from greater than zero to saturation; as an example, the average weight percentage of the dissolved salt in the polar or aqueous based phase may be at least (or alternately less than) 0.01, 0.05 0.1, 0.2, 0.25, 0.3, 0.4, 0.5, 0.6, 0.7, 0.75, 0.8, 0.9, 0.95, 0.99 of the weight percentage of this salt in water at 25° C. at maximum solubility with other examples using ranges made up from any possible combination of these same fractions of saturation, such as 0.1 to 0.99, 0.1 to 0.9, 0.25 to 0.75, etc.

Additional or co-surfactant(s) may be used in the compositions as well. It should be understood that any co-surfactant is independently present within phase (1), phase (2), between phase (1) and (2), elsewhere within the nanoemulsion composition, or at some combination of these locations. The co-surfactant is taken as a single chemical species that is different from the material chosen for the surfactant (3), for the solid weighting agent (4) and for the dissolved salt if present, unless otherwise specified. Examples of materials that are often chosen as co-surfactants include mono-alcohols, poly-alcohols, organic acids (such as formic, acetic or citric), salts of organic acids (such as formates, acetates or citrates), amines, polyethylene glycols, ethoxylated solvents and active surface additives.

The nanoemulsion compositions may further comprise one or more additives selected from the group consisting of asphaltene dissolvers, wax dissolvers, corrosion inhibitors, viscosifiers, thinners, fluid loss control agents, lost circulation materials, alkalinity control agents, shale inhibitors, defoamers, biocides, lubricants, oxygen scavengers, and deflocculants. Similarly, they may further comprise a mineral/inorganic acid (such as HCl or $H_2SO_4$) or an organic acid (such as formic, acetic or citric) additive. Additives may be present in either the continuous or the dispersed/discontinuous phase or both.

To minimize confusion from possible overlapping components, throughout this disclosure, additives present are taken as distinct from one another and from the surfactant (3), weighting agent (4), any dissolved salt, co-surfactant or the like present and vice versa for all these.

It is possible to have polymer free (dissolved and/or otherwise) varieties of the nanoemulsions as well; polymer free may apply to such nanoemulsions overall or only to one or more phases individually therein. Similar considerations apply to amines, lignin and/or anionic surfactants.

An alternative nanoemulsion composition comprises: (1) a continuous phase, (2) a discontinuous or dispersed phase with a mean droplet size of less than 1000 nm, and (3) a surfactant; wherein, one of the phases (1) and (2) is a non-polar based phase and the other of these is a polar or aqueous based phase, with the polar or aqueous based phase comprising a polar solvent or water and a dissolved salt of formic, acetic or citric acid, of an ammonium salt or a mixture of these. The dissolved salt may be another of the salts named herein as well. This alternative nanoemulsion composition may further comprise a co-surfactant and/or one or more additives, the additives selected from the group consisting of mineral acid (such as HCl or $H_2SO_4$) or organic acid (such as formic, acetic or citric), asphaltene dissolvers, wax dissolvers, corrosion inhibitors, viscosifiers, thinners, fluid loss control agents, lost circulation materials, alkalinity control agents, shale inhibitors, defoamers, biocides, lubricants, oxygen scavengers, and deflocculants. The disclosure and discussion on detail and variations given previously for other nanoemulsions may be applied here as well as applicable.

It should be understood that the disclosure given here should be interpreted broadly enough so that any variation discussed as to composition may be used in combination with any others unless this would be contradictory or otherwise obviously inappropriate under the circumstances. The same understanding should be applied to methods as well and to combinations relating to methods and compositions as applicable.

The nanoemulsions may be formed by many methods including the following (described in detail in the chapter, "Nanoemulsions", by Salager, Forgiarini and Marquez, in *Pharmaceutical Emulsions and Suspensions*, ($2^{nd}$ edition), Nielloud and Marti-Mestres editors, Taylor and Francis (London), as applicable/adaptable which are part of the invention in this regard:

(1) By Persuasion (1.1) Phase Transition from Near-Optimum State Via Change in Single Variable It is contemplated that the nanoemulsions may be prepared by phase transition, taking advantage of the physicochemical properties of the oil/water/-surfactant systems, preferably but not limited to transitions due to changes in temperature, such as reported in Shinoda, K. et al., "The stability of O/W type emulsions as a function of temperature and the HLB of emulsifiers: The emulsification by the PIT-method", *J. Colloid Interface Sci.* 1969, 30, 258-263, or any of the variables affecting the hydrophilic-lipophilic deviation (HLD). The HLD is a dimensionless expression that represents the deviation of the formulation from the "optimum" in which the oil/water/surfactant system exhibits three-phase behavior, i.e. Winsor III type, and a minimum interfacial tension, as described by Salager et al., "Partitioning of ethoxylated octylphenol surfactants in microemulsion-oil-water systems. Influence of temperature and relation between partitioning coefficient and physicochemical formulation", Langmuir 2000, 16, 5334-5539. Changes in temperature or any of the variables affecting the HLD allow the preparation of nanoemulsions by (i) starting the emulsification process at the optimum formulation region (HLD=0) and slowly shifting it away or (ii) crossing the optimum formulation and displacing the formulation slightly from this optimum, which in both cases results in a decrease in solubilization of either the oil or aqueous phase and produces a release of the excess phase under the form of nanoemulsion size droplets.

The nanoemulsions may also be prepared by phase transition changing variables affecting the hydrophilic-lipophilic deviation HLD such as temperature, salinity of the aqueous phase, nature of the surfactant, nature of oil phase and changes in the alcohol effect. In one non-limiting embodiment, the oil/water/surfactant system close to the optimum formulation (HLD close to 0) exhibits a monophasic behavior, i.e. Winsor IV type which may produce uniform monodispersed nanoemulsions.

(1.2) Phase Transition from Near-Optimum State Via Change in Multiple Variables

Nanoemulsions may sometimes be prepared by phase transition combining changes in temperature or any of the variables affecting the hydrophilic-lipophilic deviation (HLD), and minor changes in the water to oil ratio of the system. In one embodiment, minor changes in water to oil ratio implies that the phase behavior of the oil/water/surfactant system undergoes through the formation of a liquid crystal phase.

(1.3) Catastrophic Inversion

A method is contemplated for making the nanoemulsions by catastrophic inversion of a low internal phase emulsion adding small amounts of the internal phase under low and long lasting mixing, which results in an inversion of the emulsion producing nanoemulsion size droplets of the original external phase. Allowing that the proposal of a mechanism here should in no way be construed as limiting the scope of the present methods and compositions, it is believed that this inversion process is helped by the formulation and the initial formation of multiple emulsions which makes the apparent internal phase ratio much higher than the overall one.

(1.4) Phase Transition Stabilized by Liquid Crystal Formation

Nanoemulsions herein may sometimes be prepared by a phase transition that is stabilized by the presence of liquid crystal layers wrapping around the released nanoemulsion sized droplets, as described by Forgiarini et al., "Formation and stability of nano-emulsions in mixed nonionic surfactant systems", *Prog. Colloids Polymer Sci.* 2001, 118, 184-189. In one non-restrictive embodiment, nanoemulsions prepared by transition are stabilized by a rapid change in the formulation or temperature after emulsification that produces a quick shift of the formulation from the region closed to HLD=0 to avoid fast coalescence of the nanodroplets and secure stability, as described by Salager, J. L. "Emulsions properties and related know-how to attain them" in Nielloud F & Marti-Mestres G, eds. *Pharmaceutical Emulsions and Suspensions*, Chapter 3, New York: Marcel Dekker, 2000:73-125.

2. By Brute Force

The nanoemulsions herein may sometimes also be produced using a high speed mixer, a high frequency ultra-sonic device, a high pressure homogenizer, a small pore membrane and/or the like. Using brute force type methods, nanoemulsions herein are prepared by providing an external energy input to the oil/water/surfactant system using high shear stress or inertial disruption perhaps to overcome the effect of interfacial tension and reach the levels of Laplace pressure of droplets having the expected size to fragment large microscale droplets into the nanoscale. In this embodiment, an excess of surfactant is present in the continuous phase in the form of micelles that dissociate into monomers that rapidly adsorb on the newly created surface area of the nanoemulsion sized droplets and coat the interfacial film, thereby preventing shear-induced coalescence. The concentration of surfactant in the system also plays a role in determining the limiting droplet size when all other parameters are fixed. Apparatus suitable for preparing the nanoemulsions by mechanical energy input include, but are not limited to, devices offering a high power density with a small and well defined disruption zone including:

(2.1) high speed rotor-stator machines such as colloid mills, static mixers with special orifice geometry that combine shear and elongation flow or homogenizers which provide high power density through a large pressure drop and produce either axial or radial elongation;

(2.2) microfluidizer high pressure homogenizers which offer high continuous turbulent flow and extreme extensional shear, combined with compression, acceleration and high pressure. In this type of device, streams of premixed emulsion flow through rigid micro channels;

(2.3) high frequency ultrasonic devices that provide ultrasonic disruption creating vacuum cavities followed by implosions and back and forth high-pressure shock valves that breaks up the drop of the initial premixed coarse microscale emulsion. In this process, performing a number of recirculation steps may be required to obtain reasonably uniform droplet size distributions; and (2.4) nanoemulsification by passing the internal phase through the pore of a membrane that contacts a cross flow of the continuous phase; nanoemulsions obtained through this method are practically mono-dispersed.

Methods of making nanoemulsion compositions further comprise: (1) mixing a group of components comprising an oil or other non-polar solvent and a surfactant; (2) adding a polar or aqueous based salt solution to the result of (1) with mixing; (3) mixing the result of (2); (4) adding more of the salt solution to the result of (3) while mixing; and (5) mixing the result of (4).

Some helpful "variations" in steps of this basic procedure may include one or more of: in step (2), the adding is between a minimum and maximum rate with mixing and/or is continued until the viscosity increases to at least a minimum value at a given temperature; in step (3), mixing the result of (2) continues until the viscosity drops at least below a given value at a given temperature and/or there is an energy addition condition of importance here (and/or at another step) as well; in Step (4), the adding of the salt solution is continued only to a predetermined effective overall total; and in step (5), mixing the result of (4) continues until turbidity is at least less than a given value.

In these methods of making nanoemulsion compositions, the group of components of step (1) may further comprise one or more additional or co-surfactants.

In these methods, the salt (taken as distinct throughout from weighting agents, surfactants, co-surfactants, additives, or the like also present, unless indicated otherwise) in the salt solution may be any salt that may be dissolved to some appreciable extent in a polar or aqueous based phase, including, but not necessarily limited to, soluble chlorides, bromides, sulfates, phosphates, formates, acetates or citrates or ammonium salts. In particular the salt solution may comprise a soluble salt that is a chloride of sodium, potassium, calcium, silver, cobalt, nickel, copper, zinc or iron; a bromide of sodium, potassium, calcium, silver, cobalt, nickel, copper, zinc or iron; a sulfate of sodium, potassium, calcium, silver, cobalt, nickel, copper, zinc or iron; a phosphate of sodium, potassium, calcium, silver, cobalt, nickel, copper, zinc or iron; a formate, acetate or citrate of sodium, potassium, cesium or other cation; ammonium chloride, bromide, sulfate, phosphate, formate, acetate or citrate or an ammonium salt of some other anion; or in some cases a combination of these. As to the concentration of the salt solutions used in these methods, the amount of dissolved salt in these solutions may among various embodiments be in any range possible from greater than zero to saturation; as an example, the average weight percentage of the dissolved salt in the polar or aqueous based phase may be at least (or alternately less than) 0.01, 0.05 0.1, 0.2, 0.25, 0.3, 0.4, 0.5, 0.6, 0.7, 0.75, 0.8, 0.9, 0.95, 0.99 of the weight percentage of this salt in water at 25° C. at maximum solubility with other examples using ranges made up from any possible combination of these same fractions of saturation, such as 0.1 to 0.99, 0.1 to 0.9, 0.25 to 0.75, etc.

These methods may further comprise the adding to the result of step (5), a solid weighting agent and/or one or more additives, the additives selected from the group consisting of mineral acids (such as HCl or $H_2SO4$), organic acids (such as formic, acetic or citric), asphaltene dissolvers, wax dissolvers, corrosion inhibitors, viscosifiers, thinners, fluid loss control agents, lost circulation materials, alkalinity control agents, shale inhibitors, defoamers, biocides, lubricants, oxygen scavengers, and deflocculants. The solid weighting agent may be as to type, amount and otherwise as given previously in the discussion of the nanoemulsion compositions; similarly, additives here may include those mentioned in conjunction with the description of "alternate" solid weighting agents above. Additives may be present in either the continuous or the dispersed/discontinuous phase or both. To minimize confusion from possible overlapping components, throughout this disclosure, additives present are taken as distinct from each other and the surfactant, any weighting agent, dissolved salt, co-surfactant or the like present and vice versa for all.

Additional factors of possible importance in the methods herein include temperature, salinity, component amounts and ratios, as well as factors relating to energy input.

In a more specific embodiment of the methods herein for making nano-emulsions compositions, steps (1) to (5) above are done with a co-surfactant added to the mix in step (1) and in addition: (a) in the group of components of (1), the oil is hydrogenated mineral oil, the surfactant is imidazoline with 1 to 5% (often about 3%) by weight methanol and the co-surfactant is succinamide with the surfactant and co-surfactant in a weight ratio of about 4:1, and the oil to the total of the surfactant and co-surfactant in a ratio of about 0.043 bbl:1.0 lb (15.0 liters:1 kg); and (b) the aqueous salt solution is about 45 weight percent calcium bromide in water with the amount of this salt solution added in (2) and (4), per 1.0 bbl (SI alternate is 1 cubic meter) of hydrogenated mineral oil in (1) being about 0.42 bbl (SI alternate is 0.42 cubic meter) and about 0.84 bbl (SI alternate is 0.84 cubic meters), respectively. This is similar to Example 1 given below. The embodiment just given may be "extended" so as to further comprise adding to the result of (5) a polypropylene homopolymer so that the resulting weight ratio of polypropylene homopolymer to succinamide is about 0.63:1.0; a polypropylene homopolymer and barium sulfate so that the resulting weight ratio of polypropylene homopolymer to succinamide to barium sulfate is about 0.64:1.0:17.5; or manganese tetraoxide so that the resulting weight ratio of manganese tetraoxide to succinamide is about 52.5:1.0. This "extension" is similar to Example 2 below.

The two previous embodiments (those stated as similar to Examples 1 and 2) may sometimes be "enhanced" wherein the adding with mixing of step (2) continues until the viscosity of the composition of (2) reaches a viscosity of say at least about 275 cP when measured at a shear rate of 500/s at 25° C.; and the mixing of (3) is continued until the viscosity of the composition of (3) drops say below about 20 cP when measured at a shear rate of 500/s at 25° C.

Additional nanoemulsion compositions may be defined in a product by process sense corresponding to each of the methods of making nanoemulsions compositions given in this disclosure (including all variations and combinations) and are hereby disclosed. It is worth noting here that nanoemulsion compositions may be formation path dependent; that is, different compositions may result when the same components are combined using different methods.

Using nanoemulsion compositions is also contemplated in various processes relating to the oil and gas industry. Such methods include, but are not necessarily limited to methods comprising: (1) drilling a wellbore using a fluid comprising a nanoemulsion; (2) completing a well using a fluid comprising a nanoemulsion; (3) remediating a subterranean formation using a fluid comprising a nanoemulsion; (4) stimulating a subterranean formation using a fluid comprising a nanoemulsion; and/or (5) fracturing a subterranean formation using a fluid comprising a nanoemulsion. Any of these methods may be performed with or without acid or acidizing as applicable. The nanoemulsions of these methods include nano-emulsions generally as well as any of those in particular herein.

Similarly, other methods for the use of nanoemulsions include using these emulsions in acidizing/acid treatments per se or in combination with other operations, well treatments generally, as well as in cleaning pipes, pipelines, tanks and vessels. Any of these methods may be done with or without acid or acidizing as applicable. Nanoemulsions compositions generally may be used in these methods as well as any of those described in particular herein.

Other methods include those where nanoemulsion compositions generally and those described herein in particular are used in or as fluids for oil and gas operations resulting in sag reduction and/or friction pressure reduction compared to when they are not used. According to one non-limiting embodiment in this area, reduction of friction pressure losses and reduction of solid particle sag in an oil field fluid includes suspending solid particles in the dispersed and/or continuous phase of a nanoemulsion. The resulting fluid composition may be used as an oil field fluid such as a drilling or completion fluid. The reduction in sag that is achieved is in the range of about 10% to about 30% when compared with a fluid of the same composition that does not include a nanoemulsion. The use of a nano-emulsion in an oil field fluid composition does not usually significantly increase the viscosity of the fluid. In one non-restrictive embodiment, the apparent viscosity change of the fluid composition is less than about 5, 10, 15, 20 or 25% at 25° C. The embodiments described in this paragraph may make use of nanoemulsions generally or those described in particular herein.

The methods for use of nanoemulsions may make use of nanoemulsions generally, nanoemulsions wherein the mean droplet size of the dispersed/discontinuous phase is less than 750, 500, 250 or 100 nm, and those of WO2007/112967 described previously, the latter document hereby incorporated by reference in its entirety for this purpose.

Note that in this disclosure, unless otherwise indicated, a component amount given in percent is in weight percent.

The following examples serve to illustrate some features of the present invention, but should not be taken as exhaustive or limited in this regard.

Example 1

A Nanoemulsion without a Solid Weighting Agent

Several oil-external emulsion formulations were prepared utilizing various water phase salinities (WPS) in order to demonstrate the formation of a nanoemulsion. Calcium bromide brine was employed as the internal phase of the emulsions, while hydrogenated mineral oil (EDC 99/DW; source: Total) was utilized as the external phase. An emulsifier (imidazoline with about 3% by weight methanol) and a wetting agent (succinamide) were included to properly stabilize the emulsions.

The formulations were prepared to demonstrate the formation of a brine-in-oil emulsion as well as a brine-in-oil nanoemulsion. The formulation for each fluid is shown below in Table 1.

TABLE 1

FLUID FORMULATIONS FOR EXAMPLE 1
(SI or metric equivalents are given parenthetically)

| Product | A | B | C |
|---|---|---|---|
| Hydrogenated mineral oil, bbl (liters) | 0.430 (68.4) | 0.430 (68.4) | 0.430 (68.4) |
| *Emulsifier, lb (kg) | 8 (3.63) | 8 (3.63) | (3.63) |
| **Wetting agent, lb (kg) | 2 (0.91) | 2 (0.91) | 2 (0.91) |
| Calcium bromide brine, bbl (liters) | 0.540 (85.9) | 0.540 (85.9) | 0.540 (85.9) |
| WPS, weight % $CaBr_2$ | 40 | 45 | 47.5 |
| Oil/Brine Volume Ratio | 46/54 | 46/54 | 46/54 |

*Emulsifier is the surfactant,
**Wetting agent is the co-surfactant

The emulsions were prepared using the following procedure:

1. Measure out the appropriate quantity of oil, emulsifier, wetting agent, and calcium bromide brine of the appropriate salinity to prepare 1 lab barrel of each mixture to be made.
2. Using a Multimixer and a stainless steel conical mixing cup, begin mixing the oil. Add the emulsifier and wetting agent using a syringe.
3. Allow oil/emulsifier/wetting agent blend to mix for 1 minute.
4. Begin adding the brine slowly. Once approximately half of the brine has been added, the viscosity of the mixture will increase to the point that the vortex will close. Allow two minutes of mixing for the viscosity to reduce, then add the remaining quantity of brine.
5. Allow emulsion to stabilize by mixing for at least an additional 30 minutes (at least 35 minutes total).

Using the formulations and preparation method listed above, 1 lab barrel aliquots were made of each of the fluids. After mixing, the appearance and properties of each of the fluids was documented as shown in Table 2 below. The appearance of fluids A and C were substantially identical. Both of these fluids formed stable, turbid oil-external emulsions after mixing. Fluid B manifested as a transparent stable brine-in-oil nanoemulsion. Measurements of electrical stability were performed for each of the three samples; the measurements performed for these fluids indicated that each was an oil continuous fluid (W/O).

The turbidity of each of the samples indicated the difference in droplet size between the samples. These measurements were made using a LaMotte 2020e turbidometer. For the normal invert emulsions A and C, the turbidity was >>1,000 NTU, while sample B had a turbidity of only 60 NTU. Sample B was so transparent that printed words could be read through the fluid when held behind a vial with a ½ inch (1.3 cm) diameter. Dispersed systems (systems composed of an immiscible phase dispersed in a second phase) that are translucent or transparent usually have an average droplet size of less than one micron (1000 nm).

TABLE 2

EMULSION PROPERTIES FOR EXAMPLE 1

| Property | A | B | C |
|---|---|---|---|
| Electrical stability, V | 330 | 440 | 500 |
| Turbidity, NTU | >2,000 | 60 | 1,250 |

Preparation of these fluids is different from building a standard brine-in-oil emulsion. Typically, when mixing an oil-external emulsion such as those utilized for oil-based drilling fluids, a low viscosity is observed in the initial stage of the mixing. As more and more brine is added, the viscosity begins to increase and eventually levels off as the brine addition is completed.

In the case of this example, when the brine was added to the oil, emulsifier, and wetting agent of each of samples A, B and C, an extremely high viscosity was noted after approximately half of the brine had been added. The formation of an ordered liquid crystal phase was likely responsible for the observed increase in viscosity. Imparting additional mixing energy to the fluid caused a fairly rapid breakdown of the viscosity of the fluid, indicating a phase transition probably occurred. Samples A and C transitioned to a standard opaque oil-external emulsion phase after additional mixing. Fluid B, however, transitioned to a brine-in-oil nanoemulsion fluid. After the transitioning through the (apparent) liquid crystal phase to the nanoemulsion fluid, further additions of brine did not cause reformation of the viscous phase.

For samples prepared as sample fluid B above, the maximum viscosity determined on mixing at a shear rate of 500/s was 275 cP at 25° C. This was determined by placing the oil and emulsifiers in the sample cup of an MCR 301 Anton Paar rheometer equipped with a vane stirrer. The stirrer was then started, followed by addition of the brine. This mixture was allowed to stir for 90 minutes. During mixing, the maximum viscosity occurred after 1 minute and was found to be 275 cP at 25° C. The final viscosity of the nanoemulsion after mixing was found to be 20 cP at 25° C.

In this example, a stable brine-in-oil nanoemulsion (fluid sample B) was successfully formulated and tested. The method of formation of the nanoemulsion involved choosing appropriate compositional elements (such as the salinity of the internal phase) with the application of mechanical mixing energy. The nanoemulsion formed was transparent with a high electrical stability.

The process of forming a nanoemulsion in sample B was likely a combination of the two principal methods of making nanoemulsions—by "brute force", by imparting enough shear to create fine droplets and by "persuasion", by choosing particular elements of composition or a formation path to result in a nanoemulsion. In the case of sample B, described above, the two methods were combined to form the transparent nanoemulsion. Only through the use of a narrow range of salt concentration can the nanoemulsion be formed. Employment of an internal phase with a salinity outside of this narrow range will result in formation of a standard opaque brine-in-oil emulsion rather than a nanoemulsion as seen above.

Application of mixing energy is important in this case as well. Preparation of a fluid of the same composition as sample fluid B above in a narrow glass tube without use of a mechanical mixing device appears to lead to the formation of the viscous liquid crystal phase, with a very slow apparent transition to a Winsor II state. When this procedure was carried out and 24 hours had elapsed, equilibrium had not yet been reached. An upper phase largely composed of the base oil with a small amount of surfactant present was seen, while a lower phase of a gelled aqueous phase was noted. A middle phase, thought to be a liquid crystal phase, was seen apparently in the process of separating into the oil and aqueous phases. Comparing the appearance of sample formed with little shear with that of sample fluid B above (formed with higher shear), it is apparent that application of shear was critical to forming the nanoemulsion here.

Example 2

Some Nanoemulsions Formulated with Solid Weighting Agents

All formulations in this example were prepared in the same way as the nanoemulsion in example 1 (sample fluid B), except that viscosifier and solid weighting agents were added after formation of a nanoemulsion to form a weighted, solids-laden system as applicable.

A nanoemulsion of moderate viscosity was formulated with the composition described in Table 3 below (formulation 1). Its viscosity versus strain was about 100 cP at 0.75/s versus about 20 cP at 500/s, both at 25° C. Addition of barium sulfate to this formulation (more precisely, one almost like it, see Table 3 below), showed that this fluid did not present problems of solid particle sag; no difference in density between the top and bottom of the sample was observed after 24 hours of static aging.

Formulation 2 was prepared with the components listed in Table 3 below; it contained the solid weighting agent, manganese tetraoxide, and remained stable without settling problems as well.

TABLE 3

NANOEMULSION FORMULATIONS FOR EXAMPLE 2
(SI or metric equivalents are given parenthetically)

| Product | Nanoemulsion Formulation 1 | Nanoemulsion "Formulation 1" (with Weighting Agent Barium Sulfate) | Nanoemulsion Formulation 2 (with Weighting Agent Manganese Tetraoxide) |
|---|---|---|---|
| EDC 99/DW, bbl (liters) | 0.4285 (68.1) | 0.4185 (66.5) | 0.4047 (64.3) |
| Emulsifier, lb (kg) | 7.97 (3.61) | 7.7 (3.54) | 7.53 (3.42) |
| Wetting Agent, lb (kg) | 1.99 (0.9) | 1.9 (0.89) | 1.88 (0.85) |
| 12.9 lb/gal CaBr$_2$, bbl (liters) | 0.5370 (85.4) | 0.5245 (83.4) | 0.5072 (80.6) |
| Fiber, lb (kg) | 1.25 (0.57) | 1.2 (0.57) | — |
| Manganese Tetraoxide, lb (kg) | — | — | 98.73 (44.8) |
| Barium Sulfate, lb (kg) | — | 34.07 (15.47) | — |
| Density, lb/gal (kg/liter) | 10.09 (1.21) | 10.67 (1.28) | 11.86 (1.42) |

EDC 99/DW is a hydrogenated mineral oil (source: Total)
Emulsifier is imidazoline with about 3 weight % methanol (surfactant)
Wetting Agent is succinamide (co-surfactant)
12.9 lb/gal Calcium Bromide is the same as (1.55 kg/liter)
Fiber is a polypropylene homopolymer (a viscosifier)
Manganese tetraoxide is a solid weighting agent
Barium sulfate is a solid weighting agent Example 3

Mean Droplet Size of the Discontinuous Phase of a Nanoemulsion

The mean droplet size (average droplet diameter) of the discontinuous phase of the nanoemulsion fluid B of Example 1 was determined by Dynamic Light Scattering (DLS), also known as Photon Correlation Spectroscopy (PCS). This technique was described previously. The value obtained was about 56.9 nm.

Applicants apply nanoemulsions to friction pressure losses and the subsidence of solid weighting materials, as well as other needs for better efficiency through their use in drilling, completion, remediation and other oil field fluids and processes.

In the foregoing specification, the invention has been described with reference to specific embodiments thereof, and has been suggested as effective in providing effective methods and compositions for improving drilling fluids and completion fluids used in drilling and completing subterranean reservoirs and formations. The methods and fluids herein are also useful in remediating and stimulating formations, such as by fracturing. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and/or reaction conditions for forming the nanoemulsions, whether modified to have particular shapes or certain functional groups thereon, but not specifically identified or tried in a particular drilling or completion fluid to improve the properties therein, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A thermodynamically unstable nanoemulsion composition comprising:
    (1) a non-polar based continuous phase,
    (2) a polar based discontinuous phase with a mean droplet size of less than 1000 nm,
    (3) a surfactant, and
    (4) a solid weighting agent.

2. The thermodynamically unstable nanoemulsion composition of claim 1, wherein the mean droplet size of the discontinuous phase is between 400 nm and 700 nm, and the non-polar based phase is an oil phase and the polar based phase is an aqueous phase.

3. The thermodynamically unstable nanoemulsion composition of claim 2, wherein the solid weighting agent is selected from the group consisting of barium sulfate, calcium carbonate, hematite, ilmenite, siderite, manganese tetraoxide and combinations thereof.

4. The thermodynamically unstable nanoemulsion composition of claim 2, wherein the aqueous phase comprises water and a dissolved salt, the dissolved salt being different from the material chosen for the surfactant (3) and for the solid weighting agent (4).

5. The thermodynamically unstable nanoemulsion composition of claim 4, wherein the dissolved salt in the aqueous phase is selected from the group consisting of:
    a chloride of sodium, potassium, calcium, silver, cobalt, nickel, copper, zinc or iron;
    a bromide of sodium, potassium, calcium, silver, cobalt, nickel, copper, zinc or iron; a sulfate of sodium, potassium, calcium, silver, cobalt, nickel, copper, zinc or iron;
    a phosphate of sodium, potassium, calcium, silver, cobalt, nickel, copper, zinc or iron;
    a formate of sodium, potassium, cesium or other cation;
    an ammonium salt; and
    combinations thereof.

6. The thermodynamically unstable nanoemulsion composition of claim 2, further comprising a co-surfactant, where the co-surfactant is different from the material chosen for the surfactant (3) and for the solid weighting agent (4) and is selected from the group consisting of a mono-alcohol, a poly-alcohol, an organic acid, a salt of an organic acid, an amine, a polyethylene glycol, an ethoxylated solvent and combinations thereof.

7. The thermodynamically unstable nanoemulsion composition of claim 1, wherein the surfactant (3) is selected from the group consisting of
- an anionic surfactant selected from the group consisting of alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters;
- a nonionic surfactant selected from the group consisting of amides, diamides, polyglycol esters, alkyl polyglycosides, sorbitan esters, methyl glucoside esters and alcohol ethoxylates;
- a cationic surfactant selected from the group consisting of arginine methyl esters, alkanolamines and alkylenediamines;
- a surfactant containing a non-ionic spacer-arm central extension and an ionic or nonionic polar group, wherein the non-ionic spacer-arm central extension results from a process selected from the group consisting of polypropoxylation, polyethoxylation and both; and
- dimeric surfactants, gemini surfactants, cleavable surfactants and fluorinated surfactants; and
- combinations thereof.

8. A thermodynamically unstable nanoemulsion composition comprising:
(1) a non-polar based continuous phase,
(2) a polar based discontinuous phase with a mean droplet size of between 400 nm and 700 nm,
(3) a surfactant, and
(4) a solid weighting agent selected from the group consisting of barium sulfate, calcium carbonate, hematite, ilmenite, siderite, manganese tetraoxide and combinations thereof.

9. The thermodynamically unstable nanoemulsion composition of claim 8 wherein the non-polar based phase is an oil phase and the polar based phase is an aqueous phase.

10. The thermodynamically unstable nanoemulsion composition of claim 9, wherein the aqueous phase comprises water and a dissolved salt, the dissolved salt being different from the material chosen for the surfactant (3) and for the solid weighting agent (4).

11. The thermodynamically unstable nanoemulsion composition of claim 10, wherein the dissolved salt in the aqueous phase is selected from the group consisting of:
- a chloride of sodium, potassium, calcium, silver, cobalt, nickel, copper, zinc or iron;
- a bromide of sodium, potassium, calcium, silver, cobalt, nickel, copper, zinc or iron; a sulfate of sodium, potassium, calcium, silver, cobalt, nickel, copper, zinc or iron;
- a phosphate of sodium, potassium, calcium, silver, cobalt, nickel, copper, zinc or iron;
- a formate of sodium, potassium, cesium or other cation;
- an ammonium salt; and
- combinations thereof.

12. The thermodynamically unstable nanoemulsion composition of claim 8, further comprising a co-surfactant, where the co-surfactant is different from the material chosen for the surfactant (3) and for the solid weighting agent (4) and is selected from the group consisting of a mono-alcohol, a poly-alcohol, an organic acid, a salt of an organic acid, an amine, a polyethylene glycol, an ethoxylated solvent and combinations thereof.

13. The thermodynamically unstable nanoemulsion composition of claim 8, wherein the surfactant (3) is selected from the group consisting of
- an anionic surfactant selected from the group consisting of alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, and phosphate esters;
- a nonionic surfactant selected from the group consisting of amides, diamides, polyglycol esters, alkyl polyglycosides, sorbitan esters, methyl glucoside esters and alcohol ethoxylates;
- a cationic surfactant selected from the group consisting of arginine methyl esters, alkanolamines and alkylenediamines;
- a surfactant containing a non-ionic spacer-arm central extension and an ionic or nonionic polar group, wherein the non-ionic spacer-arm central extension results from a process selected from the group consisting of polypropoxylation, polyethoxylation and both; and
- dimeric surfactants, gemini surfactants, cleavable surfactants and fluorinated surfactants; and
- combinations thereof.

14. A method of making a thermodynamically unstable nanoemulsion composition comprising:
(1) mixing a group of components comprising an oil and a surfactant, (2) adding an aqueous salt solution to the result of (1) with mixing, (3) mixing the result of (2),
(4) adding more of the aqueous salt solution to the result of (3) while mixing, and
(5) mixing the result of (4) to give a thermodynamically unstable nanoemulsion composition comprising:
(a) a non-polar based continuous phase,
(b) a polar based discontinuous phase with a mean droplet size of less than 1000 nm,
(c) a surfactant, and
(d) a solid weighting agent.

15. The method of claim 14, wherein the mean droplet size of the discontinuous phase is between 400 nm and 700 nm; and the non-polar based phase is an oil phase and the polar based phase is an aqueous phase.

16. The method of claim 14, wherein the group of components of (1) further comprises a co-surfactant.

17. The method of claim 14, wherein the aqueous salt solution comprises a salt that is selected from the group consisting of:
- a chloride of sodium, potassium, calcium, silver, cobalt, nickel, copper, zinc or iron;
- a bromide of sodium, potassium, calcium, silver, cobalt, nickel, copper, zinc or iron;
- a sulfate of sodium, potassium, calcium, silver, cobalt, nickel, copper, zinc or iron;
- a phosphate of sodium, potassium, calcium, silver, cobalt, nickel, copper, zinc or iron;

a formate of sodium, potassium, cesium or other cation; ammonium chloride, bromide, sulfate, phosphate, formate;

an ammonium salt; and combinations thereof;

with the proviso that the average weight percentage of the salt in the aqueous salt solution is at least one-tenth of the weight percentage of this salt in water at 25° C. at maximum solubility.

18. The method of claim 14, wherein the adding with mixing of (2) occurs until the viscosity of the composition of (2) reaches a viscosity of at least about 275 cP when measured at a shear rate of 500/s at 25° C., and the mixing of (3) occurs until the viscosity of the composition of (3) drops below about 20 cP when measured at a shear rate of 500/s at 25° C.

* * * * *